US012502323B2

(12) United States Patent
Li et al.

(10) Patent No.: US 12,502,323 B2
(45) Date of Patent: Dec. 23, 2025

(54) METHODS AND SYSTEMS FOR PATIENT TRANSFER

(71) Applicant: GE Precision Healthcare LLC, Wauwatosa, WI (US)

(72) Inventors: Jiaqi Li, Pewaukee, WI (US); Gregory Gerald Pieper, Spring Grove, IL (US); Mark David Schmieding, Pewaukee, WI (US); Jason Lee Philps, Merton, WI (US); Andrew John Moulton, Waukesha, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 526 days.

(21) Appl. No.: 17/820,533

(22) Filed: Aug. 17, 2022

(65) Prior Publication Data

US 2024/0058191 A1 Feb. 22, 2024

(51) Int. Cl.

| | |
|---|---|
| ***A61G 7/05*** | (2006.01) |
| ***B60B 33/00*** | (2006.01) |
| ***B60B 33/02*** | (2006.01) |

(52) U.S. Cl.

CPC ........ *A61G 7/0528* (2016.11); *B60B 33/0094* (2013.01); *B60B 33/028* (2013.01); (Continued)

(58) Field of Classification Search

CPC .............. A61G 7/0528; A61G 2203/36; A61G 2210/50; A61G 13/104; A61G 2203/30; A61G 2203/32; A61G 7/018; A61G 7/08; A61G 1/0275; A61G 2203/72; A61G 1/0237; A61G 1/0243; A61G 1/02; A61G 1/0281; A61G 1/0287; A61G 1/04; A61G 7/1046; A61G 7/1057; A61G 7/1073; A61G 2203/10; A61G 2203/70; A61G 7/012; A61G 7/00; A61G 7/0524; A61G 7/05; A61G 2203/22; B60B 33/0094; B60B 2200/242; B60B 33/028; B60B 33/0078; B60B 33/02; B60B 33/021; B60B 33/0049; B60B 33/0057; B60B 33/0073; B60B 33/0068; A61B 5/055; A61B 6/04; A61B 5/1115; A61B 5/704; B62D 51/04

(Continued)

(56) References Cited

U.S. PATENT DOCUMENTS

| | | | |
|---|---|---|---|
| 4,671,728 | A | 6/1987 | Clark et al. |
| 5,961,527 | A | 10/1999 | Whitmore, III et al. |

(Continued)

FOREIGN PATENT DOCUMENTS

| | | | |
|---|---|---|---|
| CN | 108175410 | A | 6/2018 |
| CN | 208659366 | U | 3/2019 |

(Continued)

*Primary Examiner* — Madison Emanski

(74) *Attorney, Agent, or Firm* — McCoy Russell LLP

(57) ABSTRACT

Various methods and systems are provided for patient transfer using a patient table with lockable casters. In one example, a method includes adjusting locking of the lockable casters sequentially in response to an indication of reversing of the patient table. The sequential caster locking may be based on acceleration, velocity changes, or user interface forces. In another example, the system may include sensors to detect operator input and a controller to adjust caster locking accordingly.

18 Claims, 10 Drawing Sheets

(52) U.S. Cl.
CPC ...... *A61G 2203/36* (2013.01); *A61G 2210/50* (2013.01); *B60B 2200/242* (2013.01)

(58) Field of Classification Search
USPC .......... 5/600, 601, 86.1, 620; 16/18 R, 18 B, 16/35 R, 18 CG; 180/282, 19.3, 15, 19.1
See application file for complete search history.

(56) References Cited

U.S. PATENT DOCUMENTS

| | | | | |
|---|---|---|---|---|
| 7,540,285 | B2 | 6/2009 | Connelly et al. | |
| 10,568,792 | B2 * | 2/2020 | Derenne | A61G 7/08 |
| 2003/0102172 | A1 * | 6/2003 | Kummer | A61G 7/0528<br>180/19.1 |
| 2014/0031308 | A1 | 1/2014 | Diane et al. | |
| 2017/0281440 | A1 * | 10/2017 | Puvogel | A61G 7/0527 |
| 2020/0138649 | A1 | 5/2020 | Wiggermann | |
| 2021/0046704 | A1 | 2/2021 | Huttunen et al. | |
| 2022/0008016 | A1 * | 1/2022 | Harrison | A61G 3/001 |

FOREIGN PATENT DOCUMENTS

| | | | |
|---|---|---|---|
| CN | 109620230 | A | 4/2019 |
| CN | 212574940 | U | 2/2021 |
| CN | 112773389 | A | 5/2021 |
| CN | 213666220 | U | 7/2021 |
| CN | 113273991 | A | 8/2021 |
| EP | 0923922 | A2 | 6/1999 |
| EP | 3811870 | A1 | 4/2021 |
| IN | 112353567 | A | 2/2021 |
| JP | 2014138650 | A | 7/2014 |

* cited by examiner

METHODS AND SYSTEMS FOR PATIENT TRANSFER

FIELD

Embodiments of the subject matter disclosed herein relate to magnetic resonance imaging, and more particularly, to a detachable table for a medical imaging device.

BACKGROUND

Medical imaging techniques, which may include magnetic resonance imaging (MRI), computed tomography (CT), X-ray, etc., are frequently in high demand in care settings. Commonly, multiple stakeholders may share medical imaging equipment and rely on coordinated workflows to increase capacity utilization. Medical imaging systems may use a detachable table for transferring a patient to and from the imaging device, such as an MRI scanner host. Detachable tables allow for patient preparation for imaging in dedicated rooms prior to entering the imaging room. Moreover, detachable tables may increase patient comfort by reducing bed transfers. In some examples, use of detachable tables may reduce the time interval between the completion of an imaging acquisition for one patient and initiation of the imaging acquisition for the next patient. For some operators, detachable tables may be heavy and cumbersome to steer during some patient transfer procedures. As one example, reverse maneuvers such as undocking the table from the imaging system following imaging may be challenging. This disclosure provides for systems and methods for a patient table having lockable casters that may be controlled to assist an operator during patient transfer procedures. By improving the transfer process, the amount of time in the imaging space is reduced, patient and operator comfort is increased, and overall value for multiple stakeholders is increased.

BRIEF DESCRIPTION

In one embodiment, a method for controlling a patient table having a plurality of lockable casters comprises adjusting locking of the lockable casters sequentially in response to an indication of reversing of the patient table. In this way, operator effort to control the patient table may be reduced and patient transfer operations may be made more efficient.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
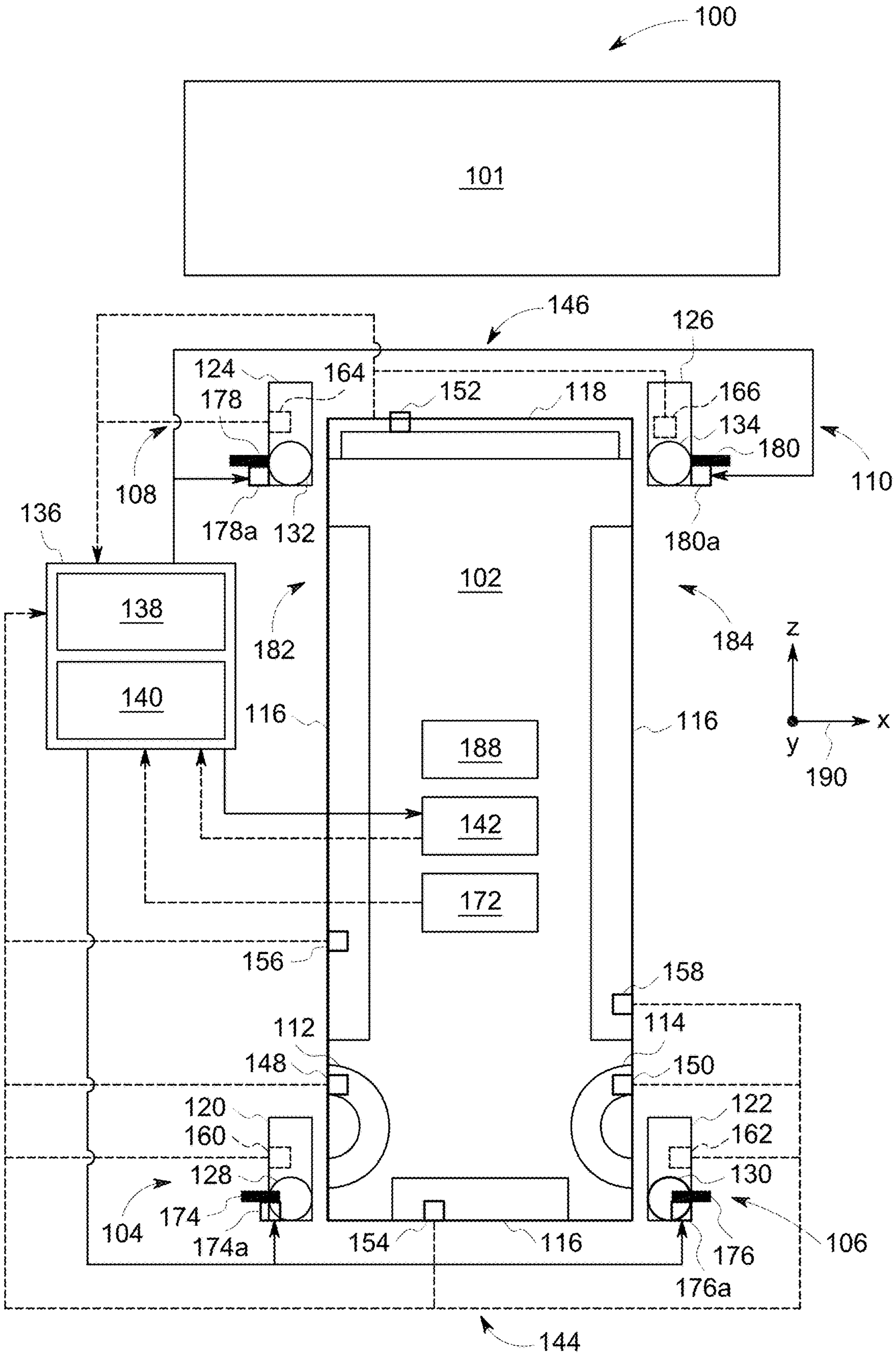
FIG. 1 is a block diagram of a patient transfer system for a medical imaging device according to an embodiment of the disclosure.
Figure 2:
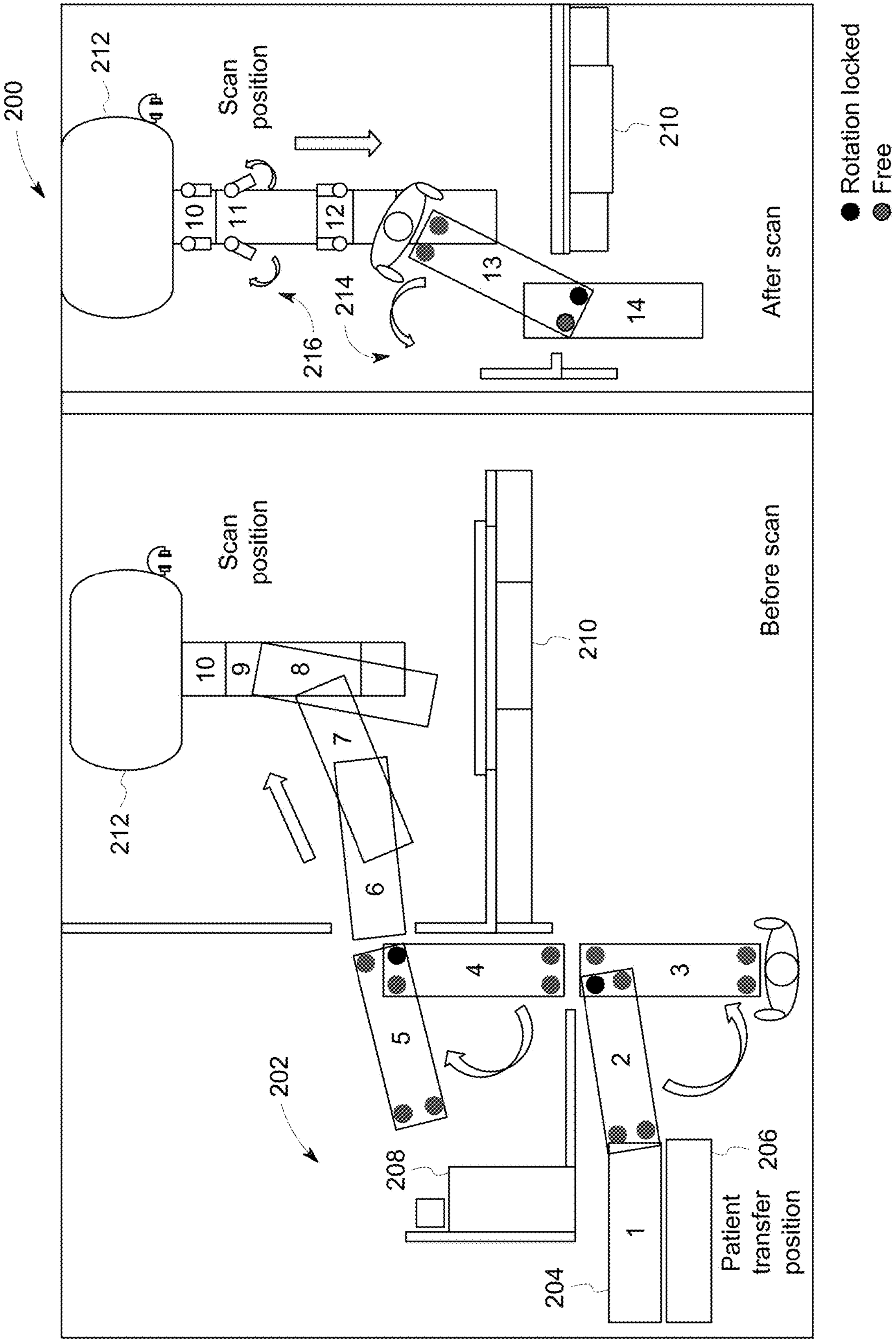
FIG. 2 is a diagram of patient transfer maneuvers using an exemplary detachable table known in the art.
Figure 3:
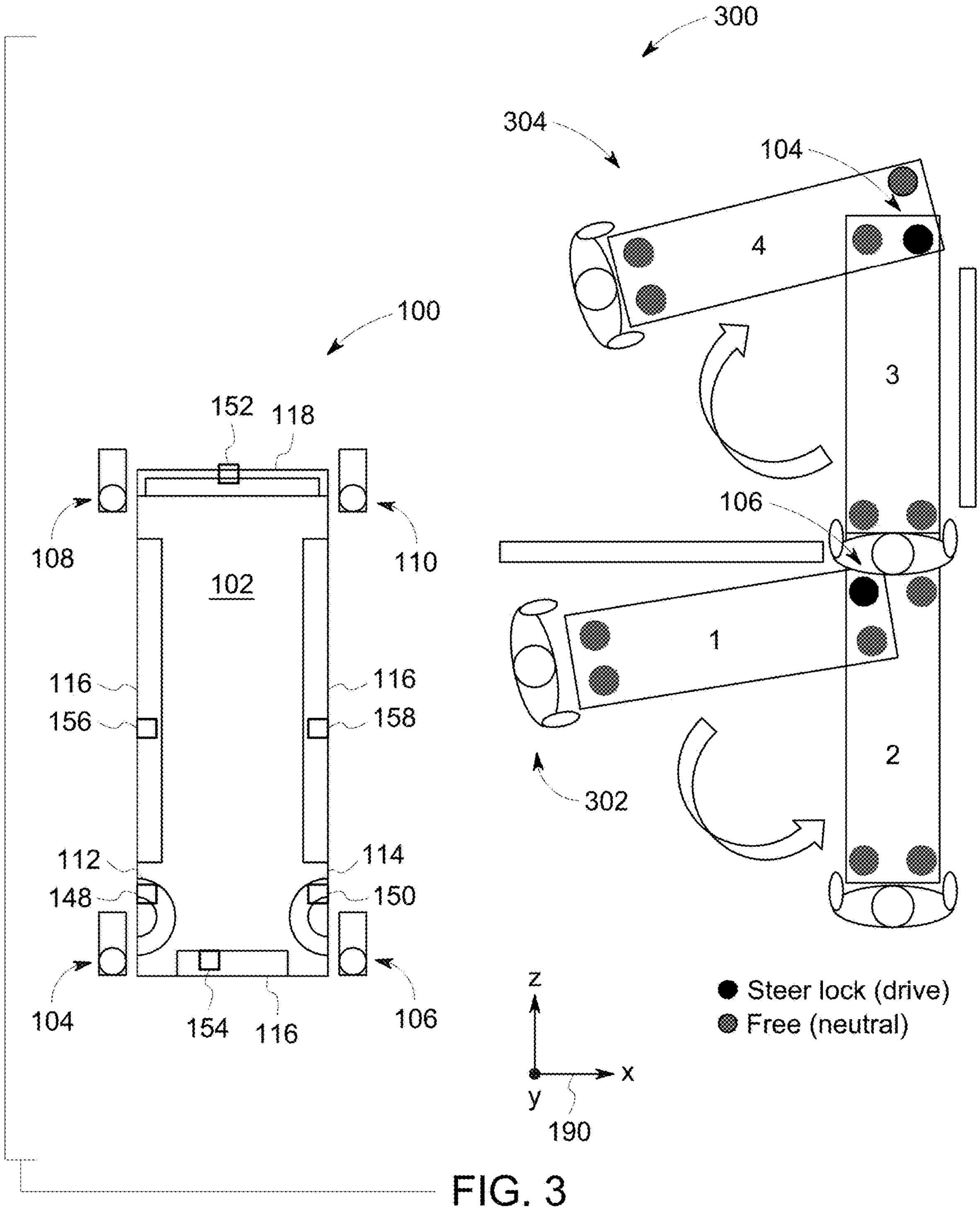
FIG. 3 is a diagram of a first example operation for the patient transfer system according to an embodiment of the disclosure.
Figure 4:
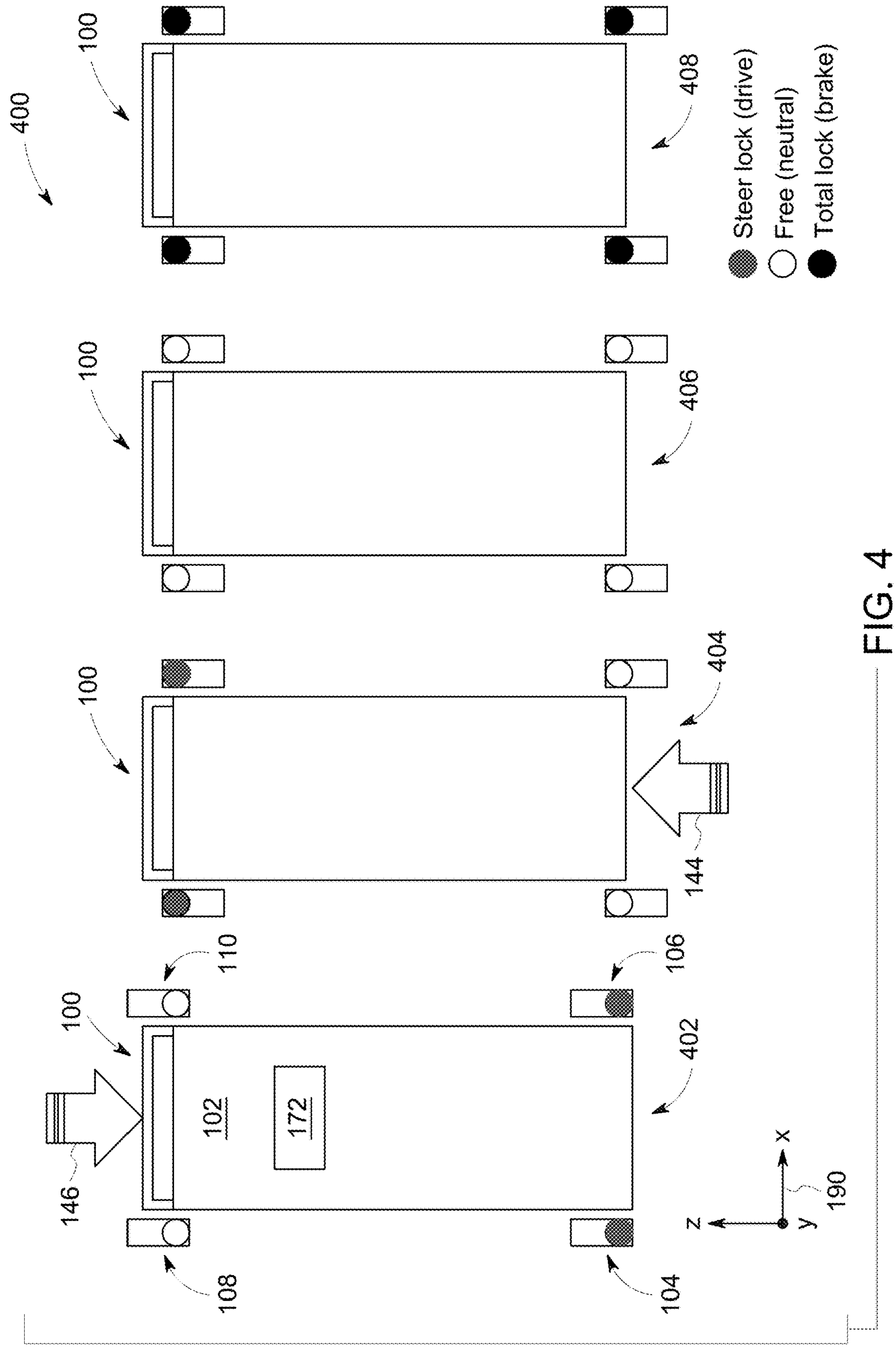
FIG. 4 is a diagram of a second example operation for the patient transfer system according to an embodiment of the disclosure.
Figure 5:
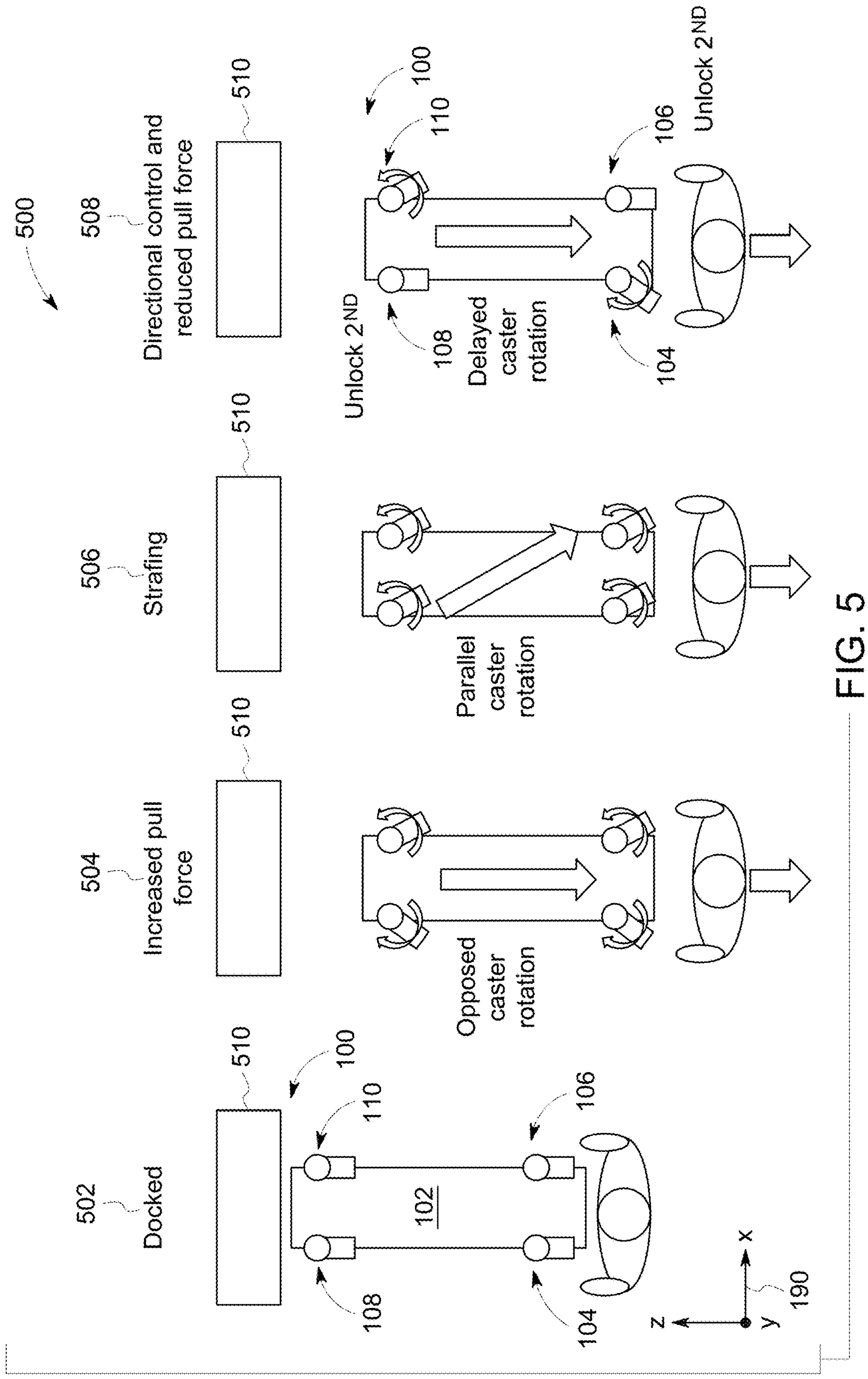
FIG. 5 is a diagram a third example operation for the patient transfer system according to an embodiment of the disclosure.
Figure 6:
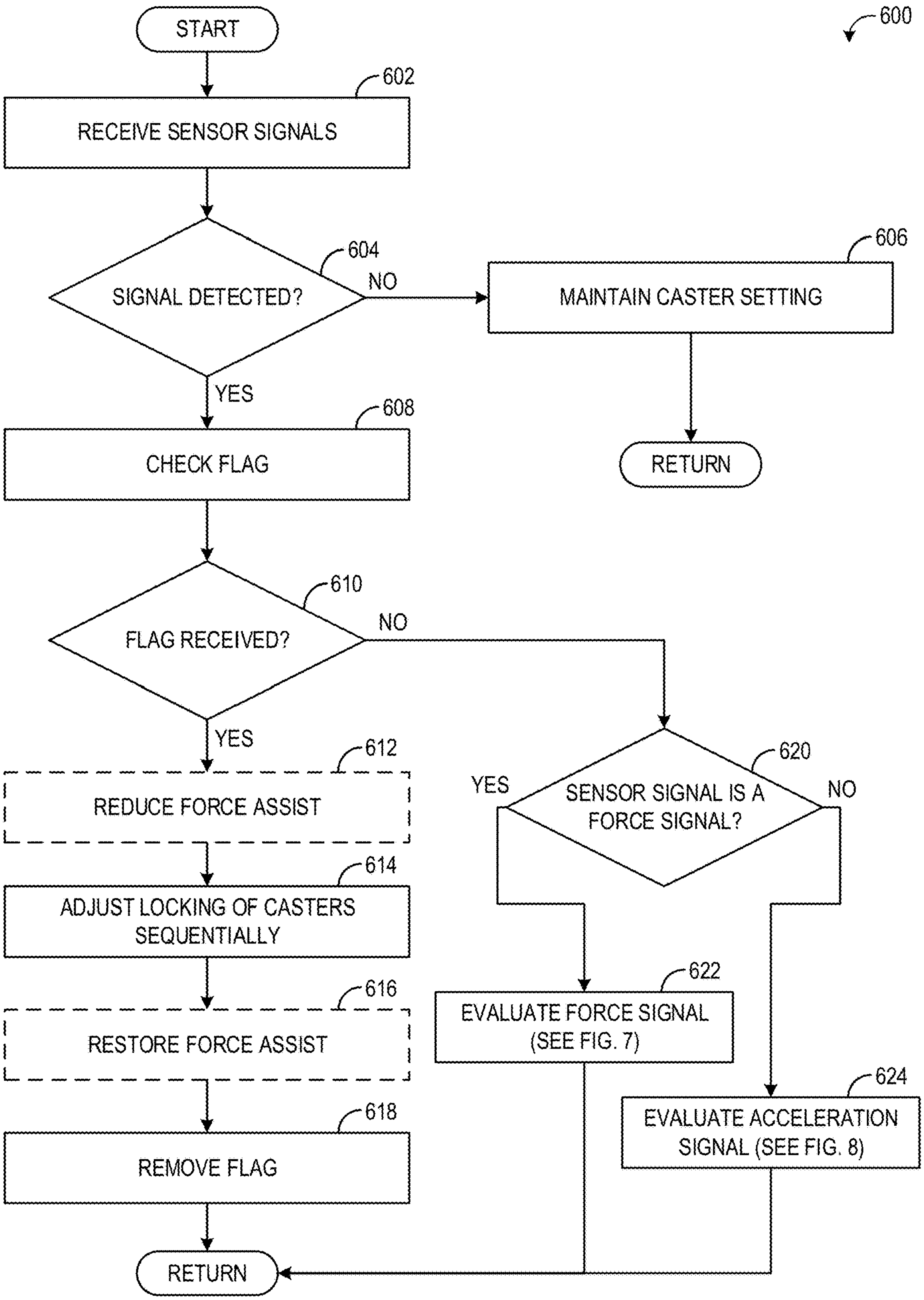
FIG. 6 is a flow chart for a first method for a patient transfer procedure using the patient transfer system according to an embodiment of the disclosure.
Figure 7:
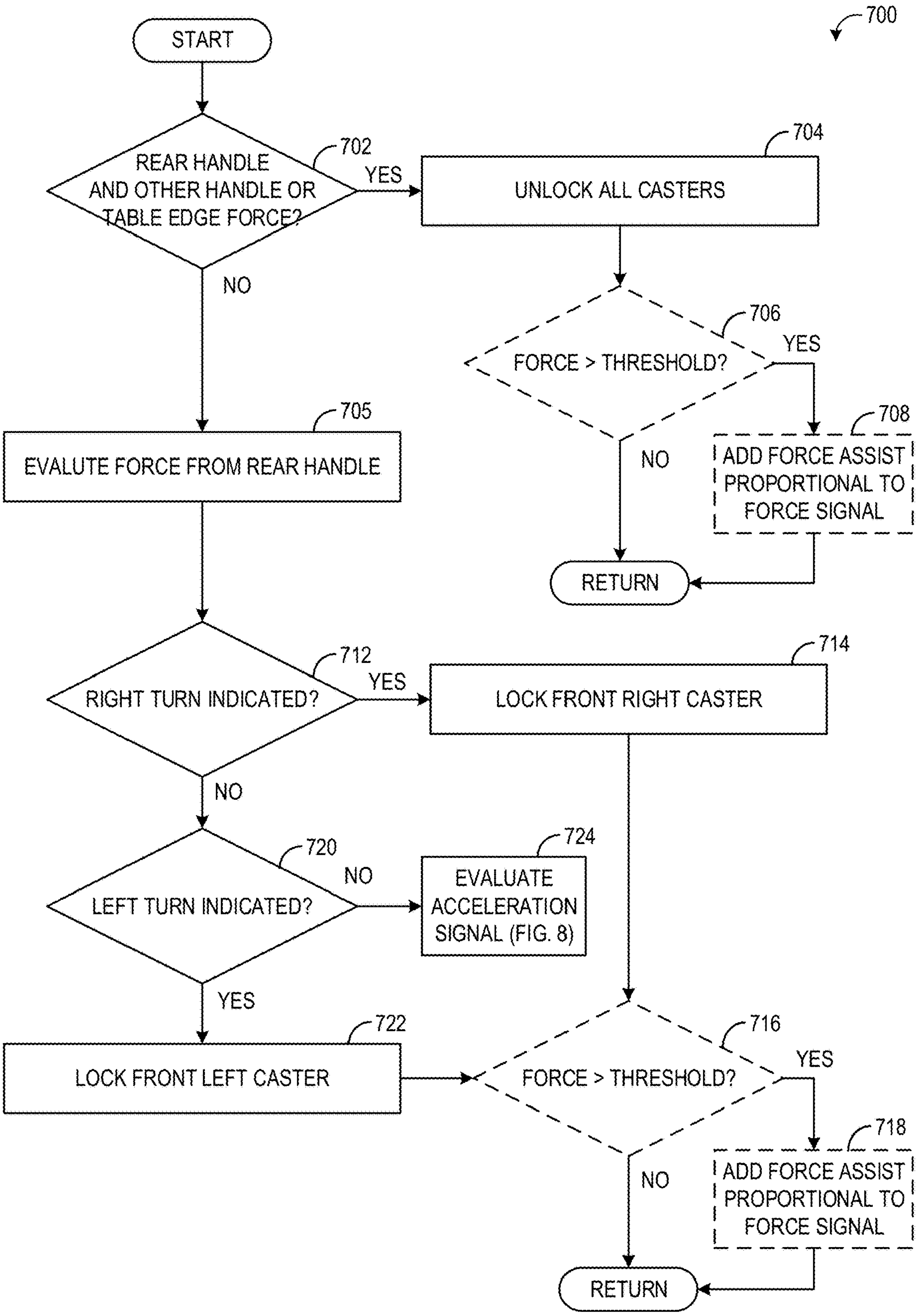
FIG. 7 is a flow chart for a second method for a patient transfer procedure using the patient transfer system according to an embodiment of the disclosure.
Figure 8:
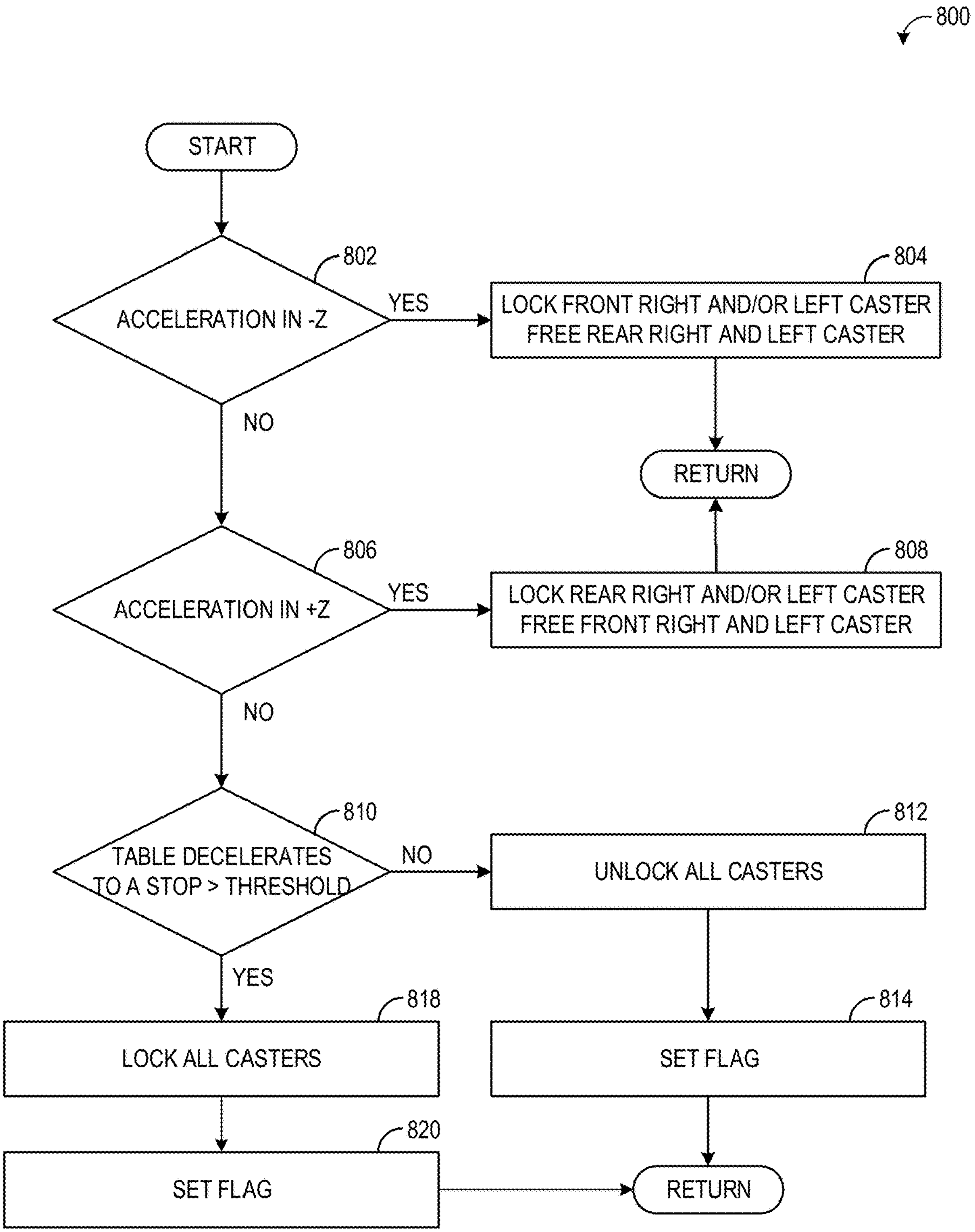
FIG. 8 is a flow chart for a third method for a patient transfer procedure using the patient transfer system according to an embodiment of the disclosure.
Figure 9:
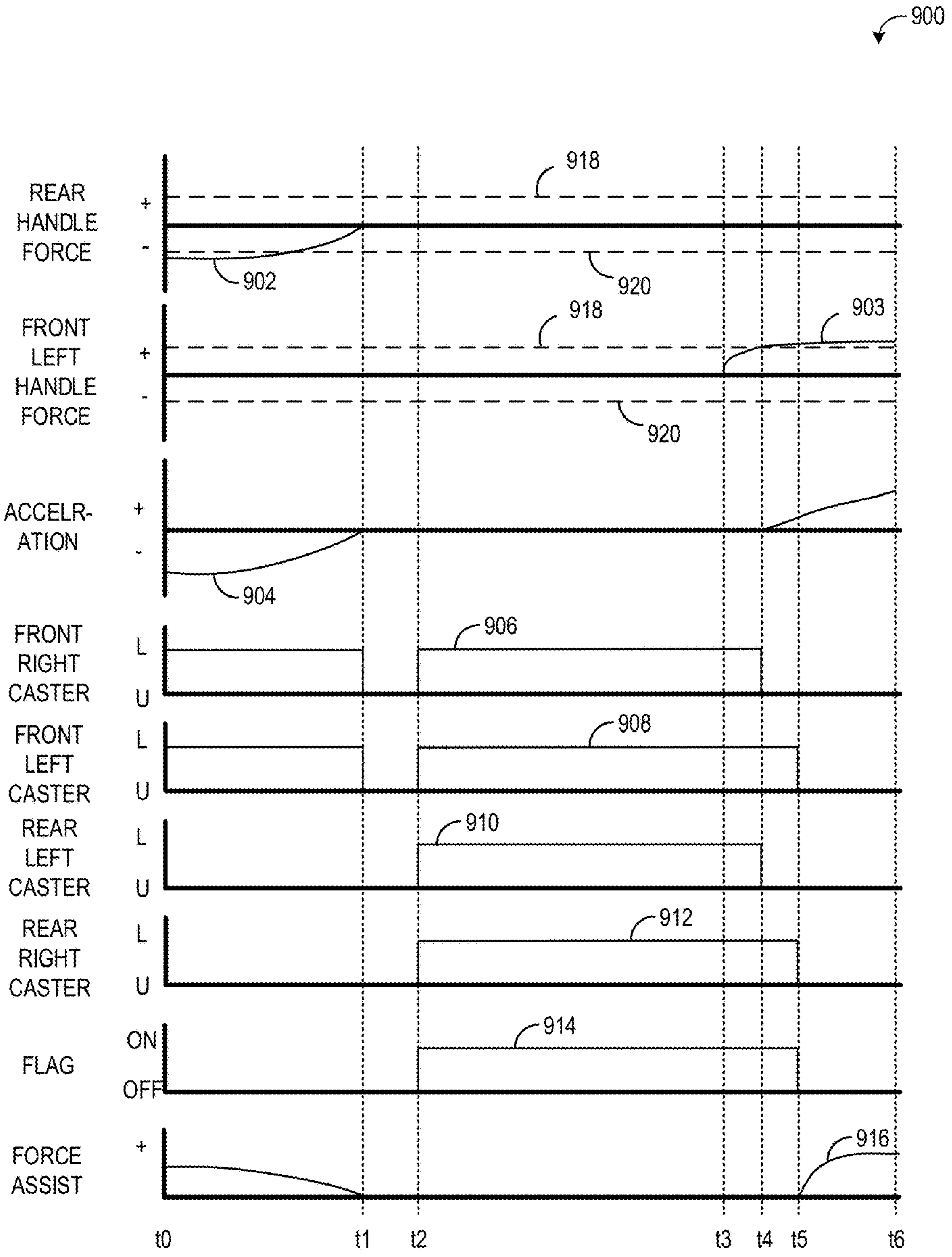
FIG. 9 is a timing diagram illustrating a first example prophetic operation of the patient transfer system according to an embodiment of the disclosure.
Figure 10:
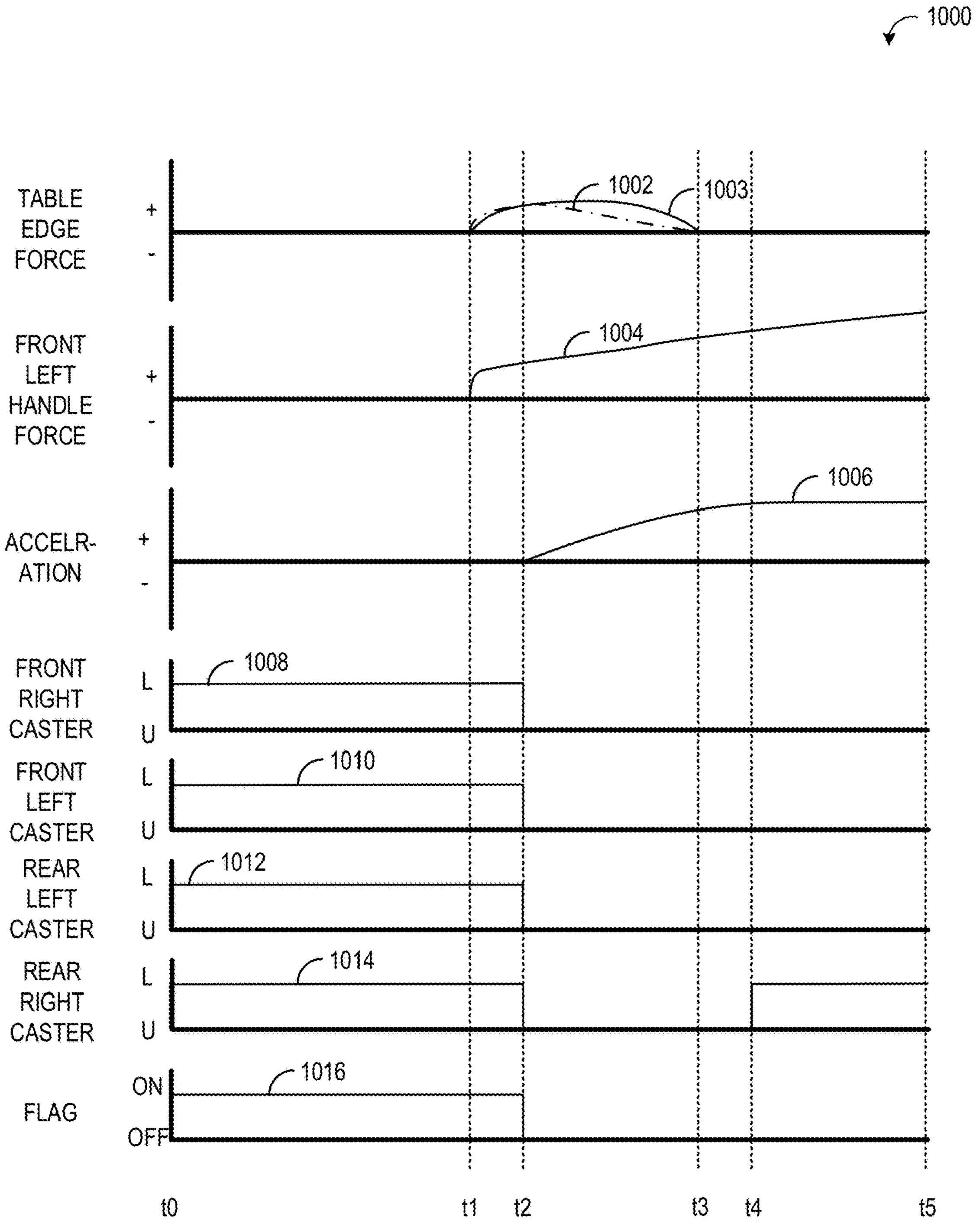
FIG. 10 is a timing diagram illustrating a second example prophetic operation of the patient transfer system according to an embodiment of the disclosure.

The following description relates to various embodiments for improving handling of a detachable table for a medical imaging device. In particular, the disclosure includes a detachable patient table for a medical imaging device, such as an MRI scanner. The patient table includes lockable casters that may be controlled to assist an operator during difficult maneuvers. The patient table may include a plurality of sensors positioned to detect operator input. In response to signals received indicating operator movement, the system may adjust locking for one or more casters. A block diagram of an example patient transfer system for a medical imaging device is given in FIG. 1. Common steering maneuvers for detachable tables known in the art are illustrated in FIG. 2. Challenging maneuvers may be made easier for an operator by assisted control of the patient transfer system. Example patient transfer operations for the patient transfer system illustrated in FIG. 1 are shown in FIG. 3, FIG. 4, and FIG. 5. Methods for improving patient table handling during patient transfer operations using the patient transfer system are illustrated in FIG. 6, FIG. 7, and FIG. 8. FIG. 9 and FIG. 10 are timing diagrams illustrating example prophetic operation of the patient transfer system.

Medical imaging techniques, such as MRI, are powerful tools frequently in high demand in care settings. As time in scanner is reduced by improvements to imaging technology, workflow efficiency including patient handling before and after scans has been identified as a target area for increasing patient throughput and capacity utilization. Detachable patient tables are used in some medical imaging systems. Detachable tables allow the patient to be prepared for imaging in a preparation room. Having been prepared for imaging, the patient may be transferred to an imaging room on the detachable table, docked to the scanner, and scanned while resting on the detachable table. Following the procedure, the patient may be transferred from the imaging room while remaining on the detachable table. While detachable tables may reduce time between scans by minimizing preparation and other non-imaging operations in the imaging room, the tables may be large, heavy, and cumbersome to maneuver.

FIG. 1 illustrates a patient transfer system 100 for an imaging device 101. As one example, the imaging system may be a magnetic resonance imaging system for transmitting electromagnetic pulse signals to a patient or subject placed in an imaging space with a static magnetic field formed to perform a scan for obtaining magnetic resonance signals from the subject. One or more images of the subject can be reconstructed based on the magnetic resonance signals thus obtained by the scan. FIG. 1 and the following figures described herein include an axis system 190.

The patient transfer system 100 includes a detachable table or patient table 102 for placing the subject thereon. The patient table 102 may include a front end 144 having a front left handle 112, a front right handle 114, and a rear end 146 having a rear handle 118. The patient table 102 may include a plurality of lockable casters rotatably coupled to the patient table 102. As one example, patient table 102 may include a first caster 104 and a second caster 106 coupled to the front end 144 and a third caster 108 and fourth caster 110 coupled to the rear end 146. In one example, the first caster 104 and the third caster 108 may be positioned on a left side 182 of the patient table 102 and the second caster 106 and fourth caster 110 may be positioned on a right side 184 of the patient table 102. The casters may include a wheel that rotates forwardly or reversely, e.g., along the z-axis, and rotates or swivels about a vertical axis of rotation, and wheel lock for controlling rotation of the caster. A wheel lock actuator such as a solenoid or stepper motor may be operated to prevent caster rotation, herein called a steer locking, and unlocking to enable rotation of the casters. In some examples, the wheel lock actuator may be capable of locking the caster in multiple discrete positions such as every 15-20 degrees, and in other examples, the wheel lock actuator may be capable of steer locking the wheel in continuous positions. In some examples, the wheel lock may be adjusted for reducing the rolling friction of the wheels of the casters. In some examples, the wheel lock may include a fully locked state that may operate as a brake. As one example, first caster 104 may include first wheel 120 rotatable about a first vertical axis 128, a first wheel lock 174, and first actuator **174*a*. Second caster 106 may include second wheel 122 rotatable about a second axis 130, second wheel lock 176, and second actuator 176*a*. Third caster 108 may include third wheel 124 rotatable about a third axis 132, third wheel lock 178, and third actuator 178*a*. Fourth caster 110 may include fourth wheel 126 rotatable about a fourth axis 134, fourth wheel lock 180, and fourth actuator 180*a***.

A plurality of sensors may be positioned on the detachable patient table 102. For example, one or more sensors may be positioned on the patient table 102 for detecting user interface force. As one example, one or more hall sensors or other suitable sensor may be used for whether a handle has been used and in which direction is the force. For example, a front left handle sensor 148 may be positioned on the front left handle 112, a front right handle sensor 150 on the front right handle 114, a rear handle sensor 152 on the rear handle 118, and edge sensors 154, 156, and 158 variously positioned on the table edge 116. In some examples, the patient table 102 may include wheel position sensors and in other examples, wheel position may not be sensed. As one example, the patient table 102 may include first wheel position sensor 160, second wheel position sensor 162, third wheel position sensor 164, and fourth wheel position sensor 166, for sensing the positions of their respective wheels. The patient table 102 may additionally or alternatively include a sensor for detecting acceleration, speed, and direction of movement, such as accelerometer 172. The patient transfer system 100 may include an onboard battery 188. The onboard battery 188 may allow the various sensors and actuators and other system components to be operable digitally and during transport.

In some examples, the patient transfer system 100 may be controlled via an electronic controller 136. Controller 136 may include a processor 138 operatively connected to a memory 140. The memory 140 may be a non-transitory computer-readable medium and may be configured to store executable instructions (e.g., computer executable code) to be processed by the processor 138 in order to execute one or more routines, such as those described herein. The memory 140 may also be configured to store data received by the processor 138. Controller 136 may be communicatively coupled (e.g., via wired or wireless connections) to one or more external or remote computing devices, such as a hospital computing system, and may be configured to send and receive various information, such as electronic medical record information, procedure information, and so forth. Controller 136 may also be communicatively coupled to various other components of patient transfer system 100.

Controller 136 receives signals from the various sensors of the patient table 102 and employs the various actuators of the table to adjust operation of the table based on received signals and instructions stored on the memory of controller 136. For example, the movement of patient table 102 may be controlled via an input device (e.g., handle sensors, etc.) coupled to the controller 136. Controller 136 may display operating parameters of the patient transfer system 100 via a display in electronic communication with the system. Controller 136 may receive signals (e.g., electrical signals) via the input device and may adjust operation of the patient transfer system 100 in response (e.g., responsive) to the received signals.

As one example, the subject may be moved inside and outside an imaging space by moving the patient table 102. For example, the subject may be placed on the detachable table in a preparation room prior to entering the imaging space. One or more technicians or operators may move the patient table 102 by pushing or pulling on one or more of the front left handle 112, front right handle 114, and rear handle 118, or otherwise applying force to the table such as by pushing on a table edge 116. For example, force may be applied to the patient table 102 along the z-axis to generate forward or reverse movement, side force may be applied along the x-axis to generate left or right turns (e.g., along the x-axis), and deceleration. Casters may rotate based on force applied to the patient table 102. For example, by pushing the patient table 102 down a long hall, the casters may swivel to all face one direction, such as pointing parallel with the z-axis. Caster rotation influencing movement of patient table 102 may be controlled by selectively applying the wheel lock to the wheel.

As one example, the one or more technicians may push the patient table 102 by applying force to the rear handle 118. The rear handle sensor 152 may detect force in the −z direction immediately followed by force in the z+ direction. A corresponding wheel lock output of one or more wheel actuators of the patient table 102 may be stored in a function in a memory of the controller. For example, the controller may receive the force signal and predict the operator may desire to reverse direction of travel. In response the controller may determine to sequentially lock opposite pairs of front and rear casters based on the system logic, with the input being the force signal and the output being the actuator position of the one or more wheel locks. The controller may transmit an electrical signal to an actuator of the one or more wheel locks in order to adjust each of the one or more wheels to the corresponding wheel lock output. In some examples, the controller 136 may predict operator movement of the patient table 102 using accelerometer 172 by sensing motion, speed, and direction. For example, by sensing where a motion starts, the controller 136 may predict a direction of movement or a turn and lock one or more casters to assist steering and increase overall maneuverability of the patient table 102. As another example, the controller 136 may receive operator movement of the patient table 102 using one or more force and/or acceleration sensor signals and adjust one or more wheel locks using input from the one or more wheel position sensors.

Controller 136 is shown in FIG. 1 for illustrative purposes, and it is to be understood that controller 136 may be located in various locations within, around, and/or remote from patient table 102. As an example, controller 136 may include multiple devices/modules that may be distributed throughout patient transfer system 100. As such, controller 136 may include a plurality of controllers at various locations within patient transfer system 100. As another example, additionally or alternatively, controller 136 may include one or more devices/modules that are external to patient table 102, located proximate to (e.g., in a same room) or remote from (e.g., a remote server) patient table 102. In each example, the multiple devices/modules may be communicatively coupled through wired and/or wireless connections.

In some examples, force assist, also called a hydraulic assist, may be included in patient transfer system 100. As one example, a force assist system 142 may include one or more motors coupled to one or more of the plurality of casters and in electronic communication with the controller 136. As one example, the force assist system 142 may use one or more sensors of the system to measure a force applied to one or more handles of the patient table 102 and control the velocity of the wheels proportional to the force. In one example, the controller 136 may coordinate the force assist system 142 with caster locking control. For example, based on one or more sensor signals, the controller 136 may lock one or more casters and adjust the velocity of wheels to assist a tight turn.

Though a patient table for an MRI system is described by way of example, it should be understood that the present techniques may also be useful when applied to other imaging modalities, such as CT, tomosynthesis, PET, C-arm angiography, and so forth. The present discussion of an MRI imaging modality is provided merely as an example of one suitable imaging modality.

FIG. 2 is a schematic diagram 200 illustrating exemplary patient transfer operations using a currently available detachable table for a medical imaging device. As time in imaging is reduced, patient transfer and set up time is an increasingly large component of total procedural time. Time between patients may increase when operators encounter some common patient transfer challenges. An exemplary order of patient transfer operations are numbered and a key is given to indicate where locking a caster may be useful for improving table maneuverability and ease of use.

For some users, such as technologists, operators, and nurses, maneuvering MR detachable tables through a medical facility may be challenging. For example, medical facilities may include sharp corners, hallways, and other restrictive transfer passages. Some detachable tables include motion assist technology that may help direct front and back movement of the table, but steering assist methods are limited. As a first example 202, a subject may be transferred (1) from a hospital bed 206 to a patient transfer table or detachable table 204. The operator may pivot (2) the detachable table 204 to enter (3) the patient preparation room 208. Following patient preparation, the operator may again pivot (5) to a new position (6) to align with a door of the scanner room 210 and pivot (7, 8, 9) once more to align with the scanner 212 for docking (10). As a second example 214, following a scanning procedure at the scanner 212, an operator may wish to push (13) the detachable table 204 from the rear. To exit the scanner room 210, the operator may again pivot (14) the table. Table pivots may take considerable strength to perform when casters of the detachable table 204 are not configured with wheel locks for preventing rotation at the pivot point. For example, rear and front casters enabled to lock and unlock via sensor signals positioned at front, rear, and side sensors of a detachable table, may decrease time in patient transfer operations. Additionally, table pivots may be made easier for an operator if caster locking and force assist are coordinated.

For some stakeholders, initiating table motion from rest may be challenging. As one example, during an initiation of table motion from rest, random caster rotations may result in high push and pull forces to start table motion. As a third example 216, the detachable table 204 may be brought to the scanner 212, docked (10), and undocked (11). During the docking motion, all casters will move toward the back of the table. An operator may pull the detachable table 204 in an opposite direction to undock and all casters then swivel 180 degrees to be able to move forward (12). The motion creates a lot of friction force due to the changing of the distance between the two points of the casters where they contact the floor. Moreover, sideways table drift, or strafing, may occur until the random caster rotations cease and match the direction of pull. Depending on the orientation of the random caster rotation, push and pull forces to initiate table motion may vary considerably. In the same manner, random caster rotation may also affect the magnitude of the sideways drifting experienced by an operator during initial motion. Random table motion variability is exacerbated by the tables overall weight and adds to the uncontrollable feeling the operator experiences trying to maneuver the table. Sequential release of the lock on the casters may reduce random caster rotation and enable more predictable initiation of movement from rest. Additionally, coordinating an amount of force assist for one or more casters during sequential unlocking may further minimize push and pull forces during undocking and other transfer operations involving motion initiation from rest.

FIG. 3 is a diagram of an example patient transfer operation 300 using the patient transfer system 100 for a medical imaging device described in FIG. 1. In one example, the plurality of sensors positioned on handles and other portions of the patient table 102 may sense pushing or pulling on the patient table 102 by one or more operators. Sensor signals may be processed by the controller (e.g., controller 136 in FIG. 1) and the controller may adjust operation of the patient transfer system 100 responsive to the received signals. As one example, the controller may adjust operation according to the system logic described below in table 1.

| Scenario | Rear Handle | Front Left Handle | Table Edges | Wheel Lock Output | Note |
|---|---|---|---|---|---|
| 1 | Force detected in Z−. Side force detected in X+. | No force detected in Z. No force detected in X. | No force detected. | Steer lock front right wheel. | Turning right |
| 2 | Force detected in Z−. Side force detected in X−. | No force detected in Z. No force detected in X. | No force detected. | Steer lock front left wheel. | Turning left |
| 3 | Force detected | Force Detected | Any condition | Free all wheels | 2 Techs. |
| 4 | Force detected | Any condition | Force Detected | Free all wheels | 2 Techs. |

In table 1, a first column is shown indicating a scenario number. Exemplary scenarios 1-4 are given. In other examples, more or fewer scenarios may be described by a system logic. A second column is shown indicating rear handle force sensor signals. For example, an operator pushing or pulling on the rear handle 118 may be sensed by the rear handle sensor 152. A third column is shown indicating front left handle force sensor signals. For example, an operator pushing or pulling on the front left handle 112 may be sensed by the front left handle sensor 148. A fourth column is shown indicating the table edge force sensor signals. As one example, an operator pushing or pulling on the table edge 116 may be sensed by one of the edge sensors 154, 156, and 158. The sensor signals may indicate side force in the x− or x+ direction and forward or reverse force in the z− or z+ direction as indicated by the axis system 190. A fifth column is shown indicating a wheel lock output for one or more casters of the patient transfer system 100. For example, the controller may command the steer lock (e.g., wheel locks 174, 176, 178, and 180 in FIG. 1) to prevent rotation of the wheel (e.g., wheels 120, 122, 124, and 126 in FIG. 1) for one or more of the first caster 104, second caster 106, third caster 108, and fourth caster 110. A sixth column is shown indicating a note related to the scenarios.

By way of example, the second scenario in table 1 is shown at 302. In the example patient transfer operation, the operator is pushing the table from the rear handle 118 without assistance from another technician. To pass through a doorway, the operator may pivot to align the patient table 102 with the doorway. To pivot, the operator pushes the patient transfer system 100 forward and to the right. The rear handle sensor 152 reads a force applied to the rear handle 118 in the z− direction and the x+ direction. Responsive to the force signal, the controller may command steer lock on the wheel of the second caster 106 corresponding to the front right wheel. Steer locking the wheel prevents rotation of the second caster 106 creating a pivot point for the operator to turn about in a clockwise direction.

By way of example, the first scenario in table 1 is shown at 304. In the example patient transfer operation, the operator is pushing the table from the rear handle 118 without assistance from another technician. To turn around a corner, the operator may again pivot to align the patient transfer system 100 with the passage. To pivot, the operator pushes the patient transfer system 100 forward and to the left. The rear handle sensor 152 reads a force applied to the rear handle 118 in the z− direction and the x− direction. Responsive to the force signal, the controller may command steer lock on the wheel of the first caster 104 corresponding to the front left wheel. Steer locking the wheel prevents rotation of the first caster 104 creating a pivot point for the operator to turn about in a counter clockwise direction.

Additionally or alternatively, the scenarios illustrated in table 1 may be controlled using the accelerometer 172 (e.g., see FIG. 1). As one example, the accelerometer may sense changing direction of motion and adjust the casters of the patient transfer system 100 similarly. For example, the accelerometer may sense a change from movement in the z− direction to movement in the x−. Responsive to the acceleration signal, the controller may actuate the lock on the wheel of the first caster 104 to provide a pivot point around which to turn counter clockwise.

FIG. 4 is a diagram of an example patient transfer operation 400 using the patient transfer system 100 for a medical imaging device described in FIG. 1. For this example, table casters 104, 106, 108, 110 that may be commanded to steer lock and the accelerometer 172 or similar sensor to read acceleration, speed, and direction. Sensor signals may be processed by the controller (e.g., controller 136 in FIG. 1) and the controller may adjust operation of the patient transfer system 100 responsive to the received signals. In one example, the system may monitor an absolute value of acceleration greater than a threshold. As one example, the controller may adjust operation according to the system logic described below in table 2.

| Scenario | Accelerometer | Wheel Lock Output |
|---|---|---|
| 5 | Acceleration in Z−. | Front casters steer lock. Rear casters free. |
| 6 | Acceleration in Z+. | Front casters free. Rear casters steer lock. |
| 7 | Table decelerates and stops. | All casters free. |
| 8 | Table stopped and is stationary for a customer-chosen length of time. | All casters total lock (brake). |

In table 2, a first column is shown indicating a scenario number. Exemplary scenarios 5-8 are given. In other examples, more or fewer scenarios may be described by a system logic. A second column is shown indicating accelerometer signals. For example, an operator pushing or pulling in the z+ direction, such as by pushing on the front handles or pulling on the rear handle, may be detected by the accelerometer 172. A third column is shown indicating a wheel lock output for one or more of the casters. For example, the controller may command the steer lock (e.g., by actuating one or more of wheel locks 174, 176, 178, and 180 in FIG. 1) to prevent rotation of the wheel (e.g., wheels 120, 122, 124, and 126 in FIG. 1) or fully lock, e.g., brake, for one or more of the first caster 104, second caster 106, third caster 108, and fourth caster 110.

By way of example, the fifth scenario in table 2 is shown at 402. In the example patient transfer operation, the operator pushes the patient transfer system 100 from the rear end 146. The accelerometer 172 reads acceleration in z− direction. Similarly, the operator may pull the patient table 102 from the front end 144. Responsive to the signal from the accelerometer, the controller may command steer lock on one or both of the first caster 104, e.g., corresponding to the front left wheel, and the second caster 106, e.g., corresponding to the front right wheel. Steer locking one or both of the front casters prevents random rotation to drive the patient transfer system 100 in the direction of acceleration.

As one example, the sixth scenario in table 2 is shown at 404. In the example patient transfer operation, the operator pushes the patient transfer system 100 from the front end 144. The accelerometer 172 reads acceleration in z+ direction. Similarly, the operator may pull the patient transfer system 100 from the rear end 146. Responsive to the signal from the accelerometer, the controller may command steer lock on one or both of the third caster 108, e.g., corresponding to the rear left wheel, and the second caster 106, e.g., corresponding to the rear right wheel. Steer locking one or both of the rear casters prevents random rotation to drive the patient transfer system 100 in the direction of acceleration.

As another example, the seventh scenario in table 2 is shown at 406. In the example patient transfer operation, the operator decelerates and stops the patient transfer system 100. Responsive to the signal from the accelerometer, the controller may command unlocking all casters devices, e.g., the first caster 104, the second caster 106, the third caster 108, and the fourth caster 110. Unlocking all casters prepares an operator to change the direction of travel by enabling casters to rotate to the direction of acceleration.

By way of example, the eighth scenario in table 2 is shown at 408. In the example patient transfer operation, the operator stops moving the patient transfer system 100 for a duration greater than a threshold time. For example, the duration of time may be determined by the operator and programmed into the controller. Responsive to the signal from the accelerometer, the controller may command locking all casters devices, e.g., the first caster 104, the second caster 106, the third caster 108, and the fourth caster 110. In one example, locking all casters may be a braking operation, e.g., fully locked, for the patient transfer system 100.

Additionally or alternatively, the scenarios illustrated in table 2 may be controlled using one or more of force sensors (e.g., rear handle sensor 152 and front left handle sensor 148 in FIG. 1). As one example, the sensors may sense changing force in the z− direction, including reduced and ceased force, and the casters may adjusted similarly to the system logic illustrated in table 2. For example, the rear handle sensor 152 may read force in the z− direction. Responsive to the force signal, the controller may command steer lock on one or both of the first caster 104 and the second caster to drive the patient transfer system 100 in the direction of travel.

FIG. 5 is a diagram of an example patient transfer operation 500 using the patient transfer system 100 for a medical imaging device described in FIG. 1. For this example, lockable casters 104, 106, 108, 110 may be adjusted sequentially from locked to unlocked, or vice versa, delaying caster rotation to minimize random table movements. As one example, adjusting locking sequentially may be commanded in response to an indication of reversing of the patient table 102. The indication may be based on one or more sensors sensing acceleration, speed, and direction such as from the accelerometer 172 or similar sensor. As another example one or more sensors measuring a change in velocity, such as from positive to negative and negative to positive, may indicate a reversing of the patient table 102. Additionally or alternatively, one or more sensors detecting user interface force may indicate reversing of the patient table 102. For example, an operator pushing on a handle of the patient table 102 may be detected by a handle sensor (e.g., front left handle sensor 148) as a force signal indicating a reversing of the patient table 102. Sensor signals may be processed by the controller (e.g., controller 136 in FIG. 1) and the controller may adjust operation of the patient transfer system 100 responsive to the received signals.

As a first example, the patient table 102 is docked 502. The patient table 102 of patient transfer system 100 may be pushed into an imaging room and docked at a scanner 510. As one example, pushing the patient table 102 into the scanner 510 aligns the casters 104, 106, 108, 110 in the direction of travel. The patient table 102 may be stationary, e.g., while docked in the scanner 510, for the duration of the imaging procedure. In some examples, the controller 136 may fully lock or brake the casters in their orientation throughout the imaging procedure.

As second and third examples, undocking from scanner 510 may induce random caster rotation as casters reverse orientation into the direction of travel. Random caster rotation may produce uncomfortable table maneuvers such as increased pull force 504 and strafing 506. Uncontrolled push and pull forces associated with table undocking, and more generally, during motion initiation from rest, and direction reversal, may vary considerably in strength. As an example, high friction forces generated by opposed caster rotation during a direction reversal may produce the increased pull force 504. Casters rotating in parallel to match the direction of travel during a direction reversal may cause the uncomfortable table drift associated with strafing 506.

In a fourth example, directional control and reduced pull force 508 may be achieved by controlling rotation of one or more casters during undocking and other operations. As one example, system logic of the patient transfer system 100 may include from an all-locked condition, e.g., table at rest, controlling casters to unlock sequentially responsive to an indication of reversing the patient table. For example, the casters may be fully locked. For example, an indication of reversing may be based on detecting acceleration or motion in opposite direction from the most recent motion. As one example, the direction of the docking motion may be stored in the memory of the controller and upon detection of the undocking motion, e.g., reverse direction acceleration, the controller may command sequential unlocking of the casters. For example, the first caster 104 and the fourth caster 110 may be unlocked first, and after a duration the second caster 106 and third caster 108 may be unlocked second. As some examples, the duration may be a duration of time or a distance.

As another example, directional control and reduced pull force 508 may be achieved by controlling caster rotation during other reversing operations. For example, from an all-unlocked condition, casters may be locked sequentially responsive to an indication of reversing the patient table such as indicated by a reverse handle force. In one example, force on the front left handle in the z+ direction, such as from pushing, may be stored in the memory of the controller and upon detection of a z− direction of force on the front left handle, such as from pulling, the casters may be locked sequentially. For example, the first caster 104 and the fourth caster 110 may be locked first, and after a first duration the second caster 106 and third caster 108 may be locked for a second duration. The delayed caster rotation may minimize the variability of push and pull forces and strafing during direction reversals resulting in a more repeatable and expected performance for reduced effort during challenging maneuvers.

FIG. 6 is a flow chart illustrating an example method 600 for a patient transfer procedure using a patient transfer system for a medical imaging device. The patient transfer system may be the patient transfer system 100 for medical imaging device 101 in FIG. 1, for example. The method 600 and the rest of the methods included herein may be executed by a controller, such as the controller 136 of FIG. 1, according to instructions stored in a memory of the controller (e.g., the memory 140 of FIG. 1) and in conjunction with one or more inputs, such as inputs received from one or more sensors (e.g., front left handle sensor 148, front right handle sensor 150, rear handle sensor 152, edge sensors 154, 156, and 158, and the accelerometer 172 positioned on the patient table 102 in FIG. 1). The controller may control actuators (e.g., first actuator 174*a*, second actuator 176*a*, and so on) of the patient transfer system responsive to sensor signals.

At 602, the method 600 receives sensor signals from the patient transfer system 100. As described above with respect to FIG. 1, a plurality of sensors for detecting movement and/or force may be positioned on the patient table 102 of patient transfer system 100. Sensors for detecting force may be positioned on the front right and left handles, the rear handle, and positioned on table edges where an operator may grab, push, or pull the table. Additionally or alternatively, a sensor for detecting acceleration, speed, and direction may be positioned on the table. In one example, sensors of the patient transfer system 100 may continuously monitor force and acceleration sensors for changes in signal magnitude and direction.

At 604, the method 600 determines whether a signal is detected. In some examples, the controller receive sensor signals and evaluate whether the signal strength is greater than a background noise level determined for the signal type. For example, signal detection may include an acceleration sensor detecting an absolute value of acceleration greater than the threshold. As another example, the signal detection may include a change in velocity from positive to negative or from negative to positive. If a signal is detected, the method checks for a flag at 608. If a signal is not detected, e.g., not greater than a background noise level, the method 600 maintains the present caster setting at 606. For example, if the casters are all locked, the casters may remain locked.

At 608, the method 600 checks for a flag. As one example, the flag may be set as part of an all-locked or all-unlocked caster operation, such as illustrated in FIG. 8 below. For example, all casters may be locked following detection of the table decelerating to stop, e.g., at rest, for longer than a threshold duration and a flag set. In another example, a flag may be set following detection that the patient table had decelerated to a stop for less than the threshold duration. In another example, the flag may indicate a direction of the last motion signal and/or last force signal (e.g., z+, z−, x+, x−) and state (e.g., locked or unlocked) of the casters. In one example, the flag may indicate whether the signal detected is a direction reversal. For example, the controller may detect a reverse handle force. As another example, the controller may detect forward motion followed by rest and then reverse motion, or immediately followed by reverse motion. As further example, the controller may detect motion in the reverse direction from the most recent motion. In another example, the flag may indicate whether the table is docked to the imaging system.

At 610, if a flag is received, the method 600 continues to 612. If a flag is not received, the method 600 continues to 620.

At 612, the method 600 may optionally reduce force assist. As described with respect to FIG. 1, the patient transfer system may include a force assist system (e.g., force assist system 142). During patient transport, the force assist system may reduce operator effort to push and pull the table. However, during a direction reversal, when casters may rotate randomly to align into the direction of travel, force assist may increase the strength of push and pull forces associated with the random caster rotations. Temporarily reducing the responsiveness of force assist may reduce the magnitude of push and pull forces and sideways drifting during initial motion. As one example, the method 600 may include reducing force assist for a first duration based on an indication of reversing less than a first threshold and reducing force assist for a second duration based on an indication of reversing greater than a first threshold. For example, the indication of reversing may be force on a handle and the first threshold a magnitude of force on the handle. As another example, the first duration may be the duration of time determined for unlocking the first set of casters. The second duration may be the duration of time determined for unlocking all four casters. As another example, the second duration may be an amount of time estimated for all of the casters to swivel into the direction of travel. In some examples, such as patient transfer systems without a force assist system, the method 600 may skip 612.

At 614, the method 600 includes adjusting locking of the casters sequentially. In one example, the method 600 may determine whether to command unlocking sequentially from locked or locking sequentially from unlocked based on the flag at 608. For example, the method may include unlocking one of the front casters and at the same time unlocking the rear caster on the opposite side of the table. After a threshold duration, the method may include unlocking the other front caster and at the same time unlocking the other rear caster. As some examples, the duration may be a duration of time or a distance. For example, a duration of time empirically determined to align casters in a reverse direction may be programmed into the controller. As another example, a travel distance determined to align casters in the reverse direction may be programmed into the controller. As another example, adjusting the locking of the casters may include locking the front left caster and at the same time locking the rear caster on the opposite side of the table. After a first threshold duration, the method 600 may include locking for a second threshold duration the front right caster and at the same time locking the other rear caster.

At 616, the method may restore force assist to a default or nominal setting.

At 618, the method may remove the flag.

Returning to 610, if no flag is received the method 600 may determine whether the sensor signal is a force signal at 620. If the sensor signal is a force signal, the method 600 evaluates the force signal at 622. Force signal evaluation is described in detail in FIG. 7. If the sensor signal is not a force signal, the method 600 continues to 624 to evaluate an acceleration signal. Acceleration signal evaluation is described in more detail in FIG. 8.

The method 600 may then return. For example, the method 600 may be repeated at various times throughout patient transfer.

FIG. 7 is a flow chart illustrating an example method 700 for a patient transfer procedure using a patient transfer system for a medical imaging device. The patient transfer system may be the patient transfer system 100 for medical imaging device 101 in FIG. 1, for example. The method 700 may be an example method for evaluating a force signal received by one or more of the plurality of force sensors positioned on a patient table and adjusting locking of one or more of the lockable casters of the patient table in response to the received signal.

At 702, the method 700 determines whether the force signal is sensed at a rear handle sensor and at least one of the front left, the front right, and table edge. As one example, a force sensor signal originating from the rear handle and another table position may indicate more than a single operator is steering the table, e.g., a multiple operator condition. As another example, a force signal originating from the rear handle and another table position e.g., multiple user interface forces, may indicate the operator(s) is correcting the table direction of travel. If the method 700 determines a force signal is sensed at a rear handle sensor and another handle or table edge, the method 600 unlocks all casters at 704. For example, unlocking all casters may enable the casters to rotate freely until the table direction of travel is corrected.

Optionally, the method 700 may continue to 706. At 706, the method 700 determines whether the force signal is greater than a threshold force. As one example, the threshold force may be preset to a level to trigger use of the force assist system. In examples where the patient transfer system does not include a force assist system, the method 700 may skip 706. If the force signal is greater than the threshold force, the method 700 continues to 708. If the force signal is not greater than the threshold force, the method may return.

Optionally, at 708 the method 700 may add force assist proportional to the force signal to increase a velocity of the wheels coupled to the patient table. For example, if an operator is pushing hard, the force assist will more force than if an operator is pushing less hard. From 708, the method may return.

If the method 700 determines a force signal is not sensed at a rear handle sensor and another handle or table edge, the method 700 evaluates force from the rear handle at 705. While the example of evaluating a rear handle force signal is given in method 700, it may be appreciated that a front handle force signal may be similarly evaluated.

At 712, the method may determine whether the rear handle force signal indicates a right turn. In one example, force in the z− direction from the rear sensor may indicate an operator pushing the patient table forward from the rear handle. Force in the z+ direction from the rear sensor may indicate the operator pulling the patient table backward from the rear handle. An operator pushing the cart rightward from the rear handle may produce a force signal in z− and x+ directions. An operator pulling the cart rightward from the rear handle may produce a force signal in the x- and z+ directions. If the rear handle force signal indicates a right turn, the method continues to 714. If the rear handle force signal does not indicate a right turn, the method continues to 720.

At 714, the method 700 may lock the front right caster. For example, the controller may send an electric pulse to the lock actuator, locking the caster at the present orientation and preventing rotation of the caster. Locking the front right caster creates a pivot point around which the operator may turn the cart more easily.

Optionally, the method 700 may continue to 716. At 716, the method 700 determines whether the force signal is greater than a second threshold. In examples where the patient transfer system does not include a force assist system, the method 700 may skip 716. If the force signal is greater than the second threshold, the method 700 continues to 718. If the force signal is not greater than the second threshold, the method may return.

Optionally, at 718 the method 700 may add force assist proportional to the force signal to increase a velocity of the wheels coupled to the patient table. From 718, the method may return.

At 720, the method may determine whether the rear handle force signal indicates a left turn. An operator pushing the cart leftward from the rear handle may produce a force signal in z− and x− directions. An operator pulling the cart leftward from the rear handle may produce a force signal in the x+ and z+ directions. If the rear handle force signal indicates a left turn, the method continues to 722. If the rear handle force signal does not indicate a left turn, the method may continue to 724 where an acceleration sensor signal may be evaluated. The acceleration signal evaluation is illustrated in FIG. 8.

At 722, the method 700 may lock the front left caster. For example, the controller may send an electric pulse to the lock actuator, locking the caster at the present orientation and preventing rotation of the caster. Locking the front left caster creates a pivot point around which the operator may turn the cart more easily.

Optionally, the method 700 may continue to 716. At 716, the method 700 determines whether the force signal is greater than the second threshold. In examples where the patient transfer system does not include a force assist system, the method 700 may skip 716. If the force signal is greater than the second threshold, the method 700 continues to 718. If the force signal is not greater than the second threshold, the method may return.

Optionally, at 718 the method 700 may add force assist proportional to the force signal to increase the velocity of the wheels coupled to the patient table. From 718, the method may return.

FIG. 8 is a flow chart illustrating an example method 800 for a patient transfer procedure using a patient transfer system for a medical imaging device. The patient transfer system may be the patient transfer system 100 for medical imaging device 101 in FIG. 1, for example. The method 800 may be an example method for evaluating an acceleration signal received by an acceleration sensor, e.g., an accelerometer, positioned on the patient table and adjusting locking of one or more of the lockable casters of the patient table in response to the received signal.

At 802, the method 800 may determine whether the acceleration signal is in the z− direction. In one example, a signal in the z− direction may indicate pushing forward from the rear handle. If the method 800 detects acceleration in the z− direction, the method continues to 804.

At 804, the method 800 may lock one or both of the front right and left caster and unlock the front rear and left caster. In one example, the locking may be a steer lock for preventing rotation of the caster about the axis of rotation. Steer locking one or both of the front right and left caster while pushing the cart from the rear handle may have an advantage of aiding an operator to maintain a straight and forward direction of travel, such as during travel through long and straight corridors. The method may return.

At 806, the method 800 may determine whether the acceleration signal is in the z+ direction. In one example, an acceleration signal in the z+ direction may indicate pushing forward from the front handle. If the method 800 detects acceleration in the z+ direction, the method continues to 808. If the method 800 does not detect acceleration in the z+ direction the method continues to 810.

At 808, the method 800 may lock one or both of the rear right and left caster and unlock the front rear and left caster. In one example, the locking may be a steer lock for preventing rotation of the caster about the axis of rotation. Steer locking one or both of the rear right and left caster while pushing the cart from the front handle may have an advantage of aiding an operator to maintain a straight and forward direction of travel. The method may return.

At 810, the method may determine whether the acceleration signal is deceleration to a stop greater than a threshold duration. In one example, deceleration to a stop for greater than a threshold duration may signal that operator is docking at an imaging system. In one example, the threshold duration may be a duration of time. A stop for less than the threshold time may indicate the operator plans to reverse direction. If the method 800 detects deceleration to a stop less than the threshold duration the method continues to 812. If the method 800 detects deceleration to a stop greater than the threshold duration, the method may continue to 818.

At 812, the method 800 may unlock all casters. In one example, the unlocking may enable an expedited direction change operation in the event an indication of direction change is received immediately thereafter. A flag may be set at 814 indicating that the casters are all unlocked. Additionally or alternatively the flag may indicate the direction of travel immediately preceding the deceleration to stop event. From 814, the method 800 may return.

If the table is at rest for longer than the threshold duration, at 818 the method 800 may lock all casters. In one example, the method may include fully locking, e.g., braking, the casters. A flag may be set at 820 indicating that the casters are all locked. Additionally or alternatively the flag may indicate the direction of travel immediately preceding the deceleration to stop event. From 820, the method 800 may return.

FIG. 9 and FIG. 10 are timing diagrams illustrating prophetic operation of methods for patient transfer procedures using a patient transfer system. The methods for patient transfer may be the same or similar as the methods described above with respect to methods 600, 700, and 800 of FIGS. 6, 7, and 8, respectively. The patient transfer system may be the same or similar to the patient transfer system 100 shown in FIG. 1, including a detachable table having lockable casters. Instructions for performing the methods described in timing diagram 900 and 1000 may be executed by a controller (e.g., controller 136) based on instructions stored on a memory of the controller and in conjunction with sensory feedback received from components of the patient transfer system, including acceleration and force sensors positioned on the patient table (e.g., accelerometer 172, front left handle sensor 148, front right handle sensor 150, rear handle sensor 152, and edge sensors 154, 156, 158) described above with respect to FIG. 1. In the prophetic examples, the controller determines whether sensor signals are indicated, and responsive to an indication, adjusts locking of one or more casters of the table, and may add an amount of force assist. With respect to FIG. 9, timing diagram 900 illustrates a first operation where in response to an indication of reversing of the patient table, casters of the patient table are unlocked sequentially. With respect to FIG. 10, timing diagram 1000 illustrates a second operation where in response to detecting multiple user interface forces, casters of the patient table are unlocked concurrently. The horizontal axis (x-axis) denotes time and the vertical markers t0-t6 identify relevant times in the timing diagram 900 and timing diagram 1000 of FIG. 9 and FIG. 10, respectively, for controlling the patient transfer system.

Timing diagram 900 shows plots 902, 903, 904, 906, 908, 910, 912, 914, and 916, which illustrate components and/or control settings of the patient transfer system over time. Plot 902 indicates rear handle force in the z direction. Rear handle force is detected by a sensor positioned on the rear handle of the patient table. Rear handle force may indicate z−, e.g., pushing on the rear handle, or z+, e.g., pulling force on the rear handle. Plot 903 indicates front left handle force in the z direction. Front left handle force is detected by a sensor positioned on the front left handle of the patient table. Front left handle force may indicate z+, e.g., pushing on the front left handle, or z−, e.g., pulling force on the front left handle. A threshold positive force 918 and a threshold negative force 920 are shown in plots 902 and 903. Response to force signals greater than the force thresholds, the controller may activate force assist to increase wheel velocity proportional to the force signal. Plot 904 indicates acceleration in the z direction detected by an accelerometer positioned on the patient table. Plot 906 indicates a condition of the front right caster that may be unlocked or locked. Plot 908 indicates a condition of the front left caster than may be unlocked or locked. Plot 910 indicates a condition of the rear left caster than may be unlocked or locked. Plot 912 indicates a condition of the rear right caster than may be unlocked or locked. Plot 914 indicates a flag condition that may be on or off. Plot 916 indicates force assist. Force assist is temporarily reduced responsive to an indication of reversing of the table such as detecting a reverse handle force. If the indication of reversing is less than one of the threshold positive force 918 and the threshold negative force 920, the duration of force assist reduction may be a shorter, first duration of time set for unlocking of the first pair of casters. If the indication of reversing is greater than one of the threshold positive force 918 and the threshold negative force 920, the duration of force assist reduction may be a longer, second duration of time set for all casters to swivel into the direction of travel. Plots 902, 903, 904, and 916 increase upwards along the y-axis.

At t0, a rear handle signal indicates force in the z− direction in plot 902. An acceleration signal indicates acceleration in the z− direction in plot 904. The patient table is controlled with the front right and front left casters locked, e.g., rotation prevented, and the rear right and rear left casters unlocked, e.g., free to swivel about the vertical axis of rotation. Locked in this way, the operator controlling the patient table from the rear is assisted to more easily travel forward and straight. The controller is applying a moderate amount of force assist.

From t0 to t1, the operator pushes the table from the rear handle in the direction of the MRI scanner. The operator slows as approaching the scanner, preparing to dock to the imaging device. The rear handle sensor indicates reducing force in the z− direction in plot 902. The acceleration sensor detects deceleration in the z− direction in plot 904. Front casters remain locked. Force assist decreases proportional to the decreasing rear handle force signal.

At t1, the patient table is in position at the MRI scanner, e.g., docked. Force sensors indicate no forward or backward force (z=0) are being applied to the rear or front handles in plot 902 and 903, respectively. There is no acceleration detected (z=0) in plot 904. Force assist is off in plot 916.

From t1 to t2, in response to the sensors indicating deceleration to a stop, the front right and front left casters are adjusted from locked to unlocked in plots 906 and 908, respectively. At t2, after a threshold duration of time, e.g., t1 to t2, all casters are adjusted from unlocked to locked, and the flag is set in plot 914. As one example, the threshold duration of time may be set by an operator of the patient transfer system. As one example, the threshold duration is 30 seconds. The flag is stored in the memory of the controller including the state of the casters, e.g., all locked, and status of the table, e.g., docked at the scanner. In other examples, the flag may indicate a last direction of force or acceleration.

From t2 to t3, the patient table remains at rest while the patient undergoes an imaging procedure. In some examples, all casters remain locked. There is no indication of force applied to table handles or acceleration.

At t3, the operator pushes on the front left handle in plot 903 indicating reversing of the patient table. The indication of reversing of the table is less than the positive force threshold 918. From t3 to t4, in response to receiving the force sensor signal, the controller checks the flag. The flag indicates the table is docked and the casters are all locked.

At t4, force assist reduction is set for the shorter, first duration of time. Responsive to the flag indication, the casters are unlocked sequentially. The front right caster in plot 906 and the rear left caster in plot 910 are unlocked first. From t4 to t5, the operator pushes on the front left handle and the force signal increases in the z+ direction. The acceleration signal detects increasing movement in the z+ direction as the patient table is undocked from the medical imaging device. As the operator pushes the table from the imaging system, no movement in the x+ or x− direction is detected.

At t5, after a duration of time, e.g., from t4 to t5, the front left caster in plot 908 and rear right caster in plot 912 are unlocked. Force assist is restored to the nominal setting. By delaying caster rotation during initial table motion, the undocking procedure is smooth and with minimal strafing. The front left sensor signal indicates force on the front left handle in the z+ direction exceeds to the positive force threshold 918.

From t5 to t6, responsive detection of force signal greater than the threshold, force assist increases proportional to the force signal. The acceleration signal of the patient table increases with the application of force assist and force on the front left handle plateaus.

Timing diagram 1000 of FIG. 10 illustrates a second prophetic example of a method for patient transfer using a patient transfer system, such as patient transfer system 100 illustrated with respect to FIG. 1. Timing diagram 1000 shows plots 1002, 1003, 1004, 1006, 1008, 1010, 1012, 1014, and 1016, which illustrate components and/or control settings of the patient transfer system over time. Plot 1002 and plot 1003 indicate table edge force in the x direction and z direction, respectively. Table edge force is detected by sensors positioned on the edges of the patient table. Table edge force may indicate x−, e.g., pushing right, or x+, e.g., pushing left. Table edge force may indicate z−, e.g., pushing toward the rear handle, or z+, e.g., pushing toward the front handles. Plot 1004 indicates front left handle force in the z direction. Front left handle force is detected by a sensor positioned on the front left handle of the patient table. Front left handle force may indicate z+, e.g., pushing on the front left handle, or z−, e.g., pulling force on the front left handle. Plot 1006 indicates acceleration in the z direction detected by an accelerometer positioned on the patient table. Plot 1008 indicates a condition of the front right caster that may be unlocked or locked. Plot 1010 indicates a condition of the front left caster than may be unlocked or locked. Plot 1012 indicates a condition of the rear left caster than may be unlocked or locked. Plot 1014 indicates a condition of the rear right caster than may be unlocked or locked. Plot 1016 indicates a flag condition that may be on or off. Plots 1002, 1004, and 1006 increase upwards along the y-axis.

At t0, the patient table is at rest in a preparation room with all casters locked. The flag is stored in the memory of the controller including the state of the casters, e.g., all locked, and the prior direction of acceleration, e.g., z+.

From t0 to t1, the patient table remains at rest while the patient undergoes a preliminary examination.

At t1, an operator pushes on the front left handle in plot 1004. From t1 to t2, sensors detect increasing edge force in the x+ and z+ directions in plot 1002 and plot 1003, respectively, and increasing front level handle force in the z+ direction in plot 1004.

At t2, responsive to the indication of force applied to the front left handle and the table edge, e.g., multiple user interface forces, all casters are unlocked simultaneously and the flag is removed. In some examples, unlocking all casters responsive to more than one sensor detecting increasing force may enable the one or more table operators to move the table without steering assistance. Additionally or alternatively, all casters may be unlocked to enable one or more table operators to correct or reorient a direction of travel of the patient table.

From t2 to t3, the operator corrects the direction of travel of the patient table. Table edge force in the x+ and z+ directions decrease in plot 1002 and plot 1003, respectively, and front left handle force in the z+ direction increases. The accelerometer detects increasing acceleration.

At t3, table edge force is not detected by the table edge force sensors. From t3 to t4, front level handle force and acceleration in the z+ direction increases. At t4, responsive to the operator steering the patient table from the front handle in the z+ direction, the controller steer locks the rear right caster. Steer locking the rear right caster may assist the controller in maintaining a direction of travel. Such assistance may be desirable when transporting a patient through long corridors. From t4 to t5, the operator pushes the patient table assisted by the steer locked right rear caster.

In this way, by controlling the rotation of lockable casters of the patient table, increased control and maneuverability of the table is achieved. In response to a sensor signals indicating a turn, a pivot point may be provided at any of the plurality of casters of the table, reducing turning effort for operators and increasing flexibility in navigating varied care settings. Variability of increased pull force and strafing may be reduced by sequentially unlocking or sequentially locking casters of the table in response to signals indicating a table reversal procedure, resulting in more predictable table motion and ease of operation. The technical effect of the patient transfer system is that medical imaging workflows may be made more efficient, enabling higher capacity utilization of medical imaging systems.

The disclosure also provides support for a method for controlling a patient table having a plurality of lockable casters, comprising: adjusting locking of the lockable casters sequentially in response to an indication of reversing of the patient table. In a first example of the method, reversing is based on acceleration. In a second example of the method, optionally including the first example, reversing is based on a change in velocity. In a third example of the method, optionally including one or both of the first and second examples, reversing is based on motion in an opposite direction from a most recent motion. In a fourth example of the method, optionally including one or more or each of the first through third examples, reversing is based on user interface force. In a fifth example of the method, optionally including one or more or each of the first through fourth examples, reversing is further based on detecting a reverse handle force. In a sixth example of the method, optionally including one or more or each of the first through fifth examples, reversing is based on detecting forward motion followed by rest and then reverse motion. In a seventh example of the method, optionally including one or more or each of the first through sixth examples, reversing is based on detecting forward motion immediately followed by reverse motion. In an eighth example of the method, optionally including one or more or each of the first through seventh examples, adjusting includes unlocking from locked. In a ninth example of the method, optionally including one or more or each of the first through eighth examples, adjusting includes fully unlocking from fully locked. In a tenth example of the method, optionally including one or more or each of the first through ninth examples, adjusting includes reducing rolling friction of wheels of the lockable casters. In a eleventh example of the method, optionally including one or more or each of the first through tenth examples, adjusting is further responsive to undocking from a medical imaging device. In a twelfth example of the method, optionally including one or more or each of the first through eleventh examples, the method further comprises: reducing force assist for a first duration based on a magnitude of the indication of reversing being less than a first threshold and reducing force assist for a second duration based on the magnitude of the indication of reversing being greater than the first threshold. In a thirteenth example of the method, optionally including one or more or each of the first through twelfth examples, the method further comprises: simultaneously unlocking the lockable casters in response to an indication of one of a multiple operator condition and deceleration to stop for less than a second threshold.

The disclosure also provides support for a method for controlling a patient table having a plurality of lockable casters, comprising: during a first operation, unlocking the lockable casters sequentially, and during a second operation, unlocking the lockable casters concurrently. In a first example of the method, the first operation includes an indication of reversing of the patient table and the second operation includes one of an indication of an indication of multiple user interface forces and deceleration to stop for less than a second threshold. In a second example of the method, optionally including the first example, the method further comprises: reducing force assist for a duration during the first operation, and maintaining force assist during the second operation.

The disclosure also provides support for a patient transfer system, comprising: a medical imaging device, a patient table selectively docking to the medical imaging device, a plurality of lockable casters rotatably coupled to the patient table, a sensor coupled to the patient table, a controller communicatively coupled to the sensor and to the lockable casters, and a memory storing executable instructions that, when executed, cause the controller to receive sensor signals from the sensor, and adjust locking of the lockable casters sequentially in response to an indication of reversing of the patient table. In a first example of the system, the system further comprises: a force assist system communicatively coupled to the controller and to the patient table. In a second example of the system, optionally including the first example, the sensor is a force sensor.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling a patient table having a plurality of lockable casters, comprising:

adjusting locking of the lockable casters sequentially in response to an indication of reversing of the patient table, and reducing force assist for a first duration based on a magnitude of the indication of reversing being less than a first threshold and reducing force assist for a second duration based on the magnitude of the indication of reversing being greater than the first threshold.

2. The method of claim 1, wherein reversing is based on acceleration.

3. The method of claim 1, wherein reversing is based on a change in velocity.

4. The method of claim 1, wherein reversing is based on motion in an opposite direction from a most recent motion.

5. The method of claim 1, wherein reversing is based on user interface force.

6. The method of claim 5, wherein reversing is further based on detecting a reverse handle force.

7. The method of claim 1, wherein reversing is based on detecting forward motion followed by rest and then reverse motion.

8. The method of claim 1, wherein reversing is based on detecting forward motion followed by reverse motion.

9. The method of claim 1, wherein adjusting includes unlocking from locked.

10. The method of claim 1, wherein adjusting includes fully unlocking from fully locked.

11. The method of claim 1, wherein adjusting includes reducing rolling friction of wheels of the lockable casters.

12. The method of claim 1, wherein adjusting is further responsive to undocking from a medical imaging device.

13. A method for controlling a patient table having a plurality of lockable casters, comprising:

adjusting locking of the lockable casters sequentially in response to an indication of reversing of the patient table, and simultaneously unlocking the lockable casters in response to an indication of one of a multiple operator condition and deceleration to stop for less than a second threshold.

14. A method for controlling a patient table having a plurality of lockable casters, comprising:

during a first operation, unlocking the lockable casters sequentially; and during a second operation, unlocking the lockable casters concurrently, wherein the first operation includes a first indication of reversing of the patient table and the second operation includes one of a second indication of multiple user interface forces and deceleration to stop for less than a threshold.

15. A method for controlling a patient table having a plurality of lockable casters, comprising:

during a first operation, unlocking the lockable casters sequentially;

during a second operation, unlocking the lockable casters concurrently; and reducing force assist for a duration during the first operation, and maintaining force assist during the second operation.

16. A patient transfer system, comprising:

a medical imaging device;

a patient table selectively docking to the medical imaging device;

a plurality of lockable casters rotatably coupled to the patient table;

a sensor coupled to the patient table;

a controller communicatively coupled to the sensor and to the lockable casters; and a memory storing executable instructions that, when executed, cause the controller to:

receive sensor signals from the sensor;

unlock the lockable casters sequentially during a first operation;

unlock the lockable casters concurrently during a second operation, and reduce force assist for a duration during the first operation, and maintain force assist during the second operation.

17. The patient transfer system of claim 16, further comprising a force assist system communicatively coupled to the controller and to the patient table.

18. The patient transfer system of claim 16, wherein the sensor is a force sensor.

* * * * *